July 1, 1958
L. E. HARPER
2,841,024
CONTROLLING DEVICE
Filed Jan. 24, 1955
3 Sheets-Sheet 2
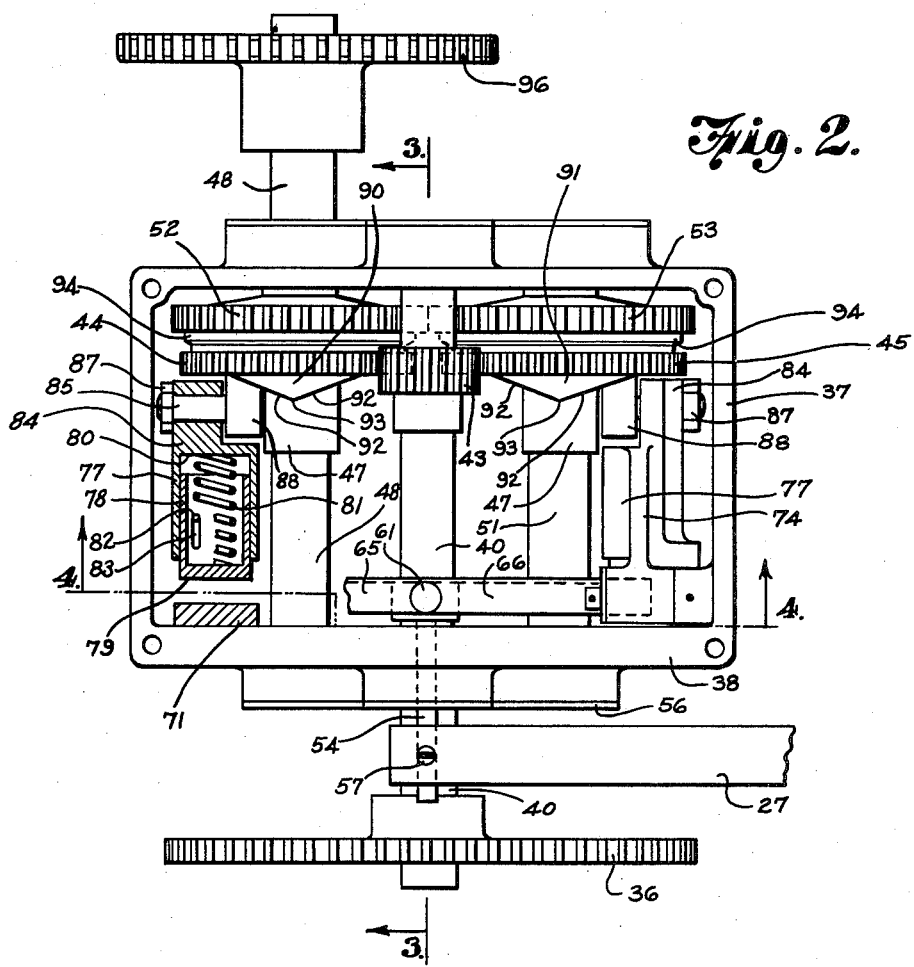
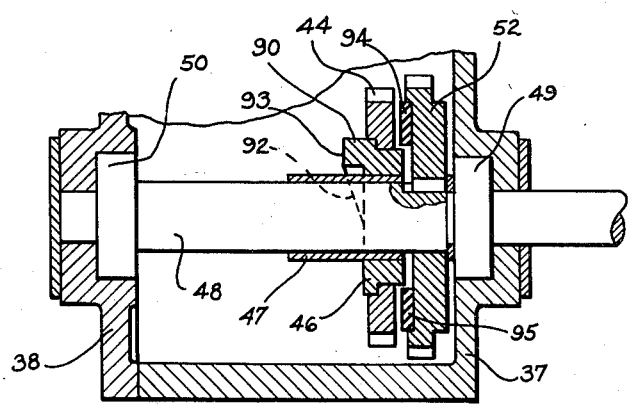
INVENTOR.
LYNDUS E. HARPER
BY
Alfred R. Fuchs
ATTORNEY July 1, 1958 L. E. HARPER 2,841,024
CONTROLLING DEVICE
Filed Jan. 24, 1955 3 Sheets-Sheet 3

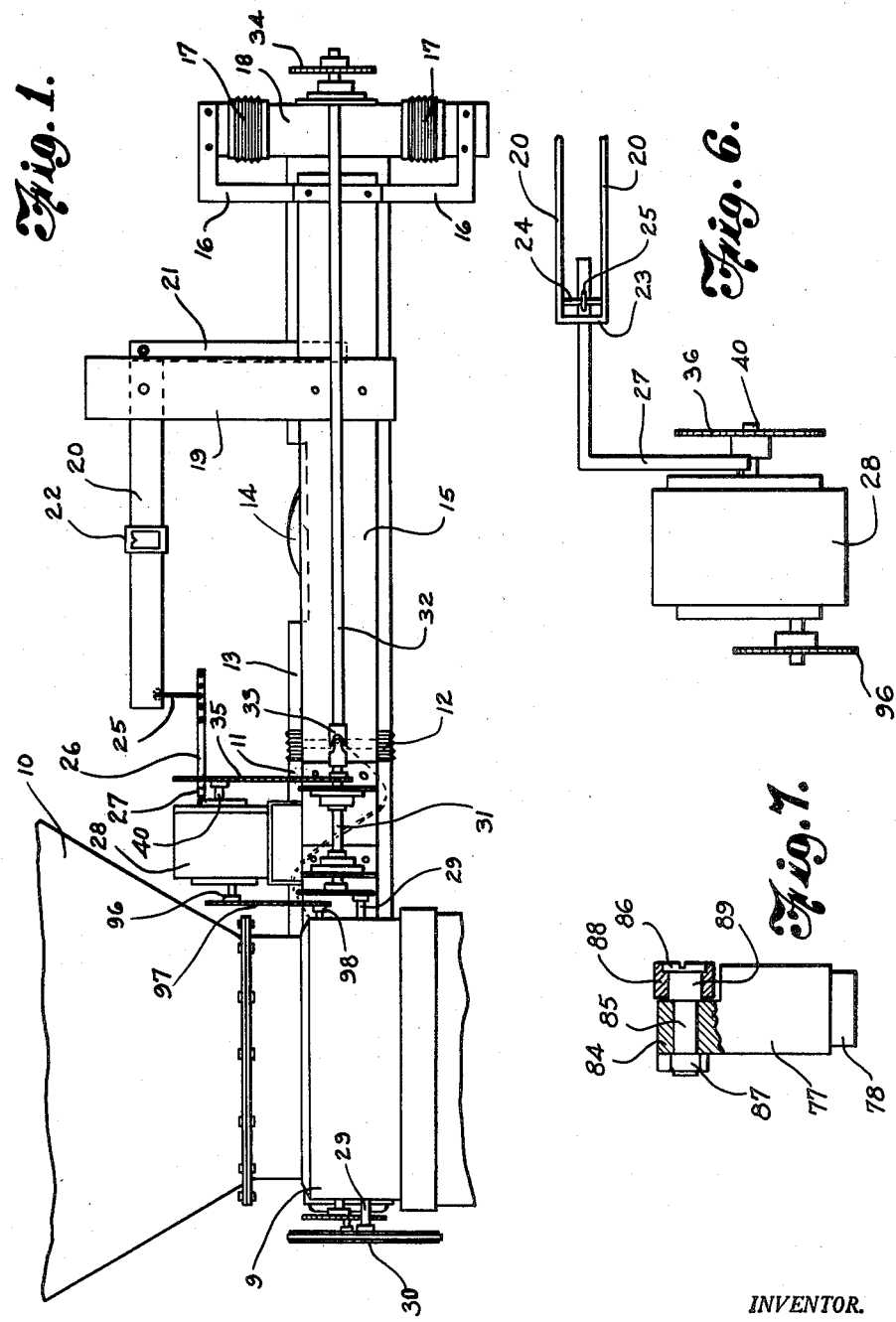

INVENTOR.
LYNDUS E. HARPER
BY
Alfred R. Fuchs
ATTORNEY

United States Patent Office 2,841,024
Patented July 1, 1958

2,841,024

CONTROLLING DEVICE

Lyndus E. Harper, West Barrington, R. I., assignor, by mesne assignments, to B-I-F Industries, Inc., a corporation of Rhode Island Application January 24, 1955, Serial No. 483,521

24 Claims. (Cl. 74—388)

My invention relates to controlling devices for controlling an adjusting member.

In controlling the output of apparatus such as feeding devices of the character disclosed in my Patent No. 2,637,434, on Belt Type Gravimetric Feeder, patented May 5, 1953, or as disclosed in the co-pending application of myself and Paul A. Coffman, Jr., Serial No. 462,863, filed October 18, 1954, the rate of feed is controlled by either the adjustment of a gate at the outlet of a hopper or similar container, or by means of a variable speed control device controlling the rate of operation of the feeding means, such as the variable speed transmission disclosed in my Patent No. 2,404,231, patented July 16, 1946. In such feed controlling means the rate of feed is controlled by the adjustment of a member that is movable in opposite directions, increasing the rate of feed by the movement thereof in one direction and decreasing the rate of feed thereof by movement in the other direction. My invention has for its purpose the provision of means for controlling the adjustment of such an adjusting member. In devices of the above referred to character it is highly desirable to control the rate of feed by output responsive means. Such output responsive means in such feeding devices is ordinarily a weighing device that includes a scalebeam or similar member movable in response to changes in the weight of the mass of material that is being fed by movement from a predetermined desired position, corresponding to a desired rate of feed in opposite directions, dependent upon whether the rate of feed is above or below that desired. While my invention is shown as being applied to a feeding device and adjusting means controlled through my improved controlling device by means responsive to the output of said feeding means, my invention is adaptable for use for controlling any member that is to be adjusted to control the output of any apparatus by a member that is responsive or indicative of the output thereof.

In such apparatus as referred to above it is frequently necessary to locate the apparatus at hazardous locations where electrical controls are not desirable, and it is accordingly one of the important purposes of my invention to provide a controlling device that is entirely mechanical in operation, but which at the same time is accurate and is responsive to small variations in the actuating member, which is normally controlled in response to output of an apparatus that is adjusted by means of my controlling device.

It is a further important purpose of my invention to provide a controlling device that is extremely rugged in construction although a very small amount of force is necessary to accomplish the adjustment of the device. While in the illustrated embodiment of the invention ordinary bearing members are provided for the shaft that controls the position of the adjusting member, if desired, this shaft can be mounted on knife edges to produce a device that requires an absolute minimum of force to adjust the position of the adjusting member.

More specifically my invention comprises an adjusting member that is movable in opposite directions and an actuating member that is movable in opposite directions from a predetermined position and means controlled by the actuating member for determining the direction and the amount of movement of the adjusting member in opposite directions determined by the amount of movement of the actuating member out of a predetermined position in which no adjustment in either direction takes place, when such actuating member is in such predetermined position, the means for controlling the movement of the adjusting member being entirely mechanical in character.

It is a specific purpose of my invention to provide such a controlling device in which the actuating member controls the position of a lever which is mounted on a shaft so as to be swingable about a central axis, said lever thus acting as a rocker member, and to provide means for rotating said adjusting member comprising a shaft rotatable in opposite directions, that has a driving connection between itself and the adjusting member, a pair of rotatable members rotated preferably at a constant rate, and means for selectively establishing a driving connection between one of the rotatable members and the shaft to rotate said shaft in a selected direction, by movement of the rocker member out of a predetermined inoperative position, in which neither of the rotatable members is connected with the shaft, to obtain the desired adjustment of said adjusting member.

Preferably the means for selectively establishing this driving connection acts for an interval determined by the amplitude of movement of the rocker member out of the predetermined inoperative position, and my apparatus is so constructed and arranged that this driving connection is only for a part of a rotation of the rotatable member rotating said shaft so that a plurality of such driving connections for variable lengths of time are made as the rotation of the rotatable member continues while the adjustment of the controlled apparatus is being accomplished to thus decrease the amount of adjustment that is made as the desired rate of operation is approached.

The particular apparatus for accomplishing this type of driving connection comprises clutching means for establishing the driving connection between each rotatable member and said shaft, cams, followers in the form of rollers engaging said cams and wedging means suspended from the ends of the rocker and normally in such a position as to not in any manner affect the movement of the follower away from the cam due to a yielding mounting provided for the follower, but movable into a position to act as means for limiting such movement of the follower away from the cam when the end of the rocker carrying the particular wedging means associated with the rotatable member to be controlled thereby is moved downwardly from its predetermined normal position, to thus cause the cam to engage the clutching means for an interval dependent upon the amount that the end of the rocker having the wedging means is lowered by means of the actuating member that determines its position. Said actuating member is preferably controlled in its position by the output of the apparatus that is being adjusted by the adjusting means that my improved controlling device serves to adjust.

Other objects and advantages of my invention will appear as the description of the drawings proceeds. I desire to have it understood, however, that I do not intend to limit myself to the particular details shown or described, except as defined in the claims.

In the drawings:

Fig. 1 is a view in side elevation of a weighing and feeding apparatus showing my improved controlling device applied thereto.

Fig. 2 is a top plan view on an enlarged scale of my improved controlling device with the cover plate removed, a portion thereof being in section.

Fig. 5 is a fragmentary section taken on the line 5—5 of Fig. 4.

Fig. 6 is a fragmentary plan view of the weighing apparatus, showing my improved controlling device in plan, and Fig. 7 is a detail view of the follower and roller mounting partly in section and partly in plan.

Figure 3:
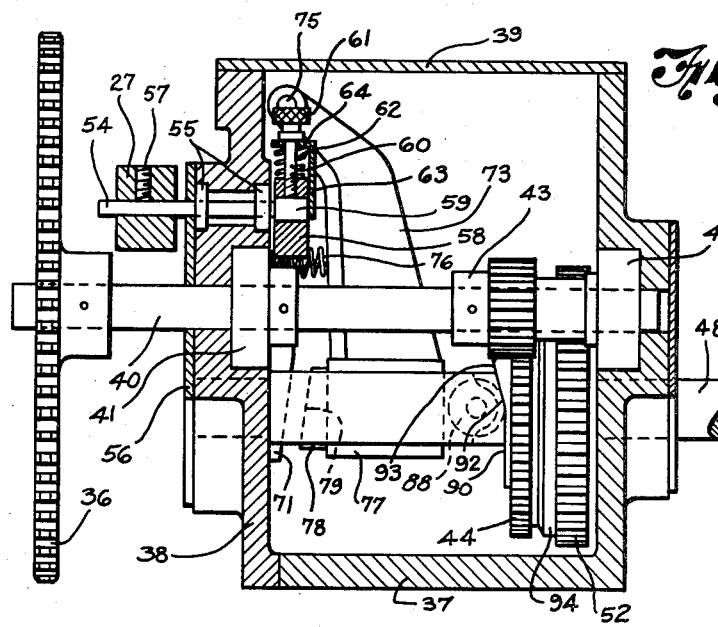
Fig. 3 is a section taken on the line 3—3 of Fig. 2.
Figure 4:
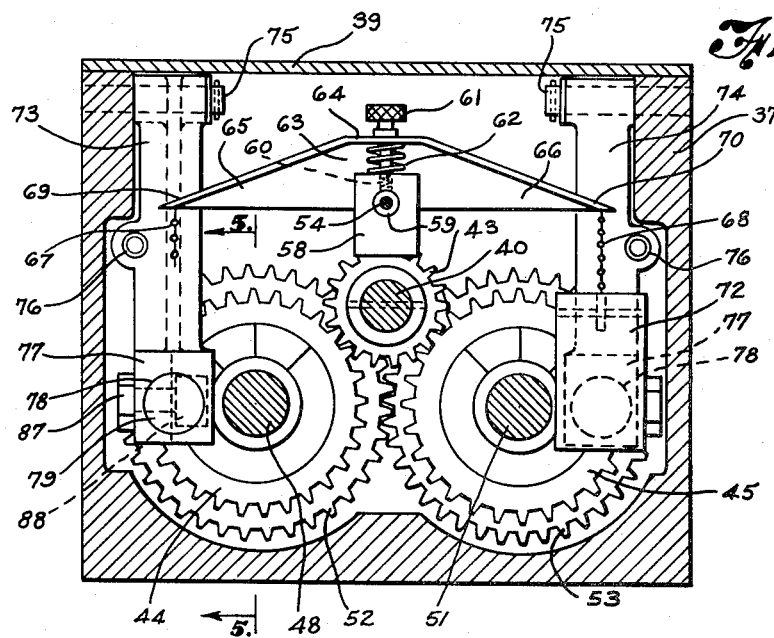
Fig. 4 is a section taken on the line 4—4 of Fig. 2.

Referring in detail to the drawings, my improved controlling device is shown as being used in conjunction with apparatus comprising a weighing and feeding device that has a hopper 10 supplying material to a feeding device 11, which is connected by means of a flexible connection 12 with a housing 13 that has conveying means 14 therein, said housing being mounted on a frame 15 by means of brackets 16 having flexible connections 17 between said brackets and a housing portion 18, with which the end of the housing 15 is connected and into which said housing 15 discharges material that is advanced by the conveying means 14, which is in the form of a screw conveyor. Said conveyor is driven at a constant rate of speed. The feeding means 11 is provided with suitable conveying means, such as is shown in the application of myself and Paul A. Coffman, Jr., above referred to, and which is driven at a speed determined by the variable speed mechanism 9, which is of the character disclosed in my Patent No. 2,404,231, patented July 16, 1946.

By providing the flexible connections 12 and 17 the tubular housing 13 is adapted to swing up and down about the end thereof that is connected with said feeding means 11 responsive to the weight of material within the housing 13 in a manner described in said above referred to application. A scalebeam 20 is suitably mounted on an upstanding portion 19 extending from the frame member 15, said scalebeam 20 being connected with the housing 13 by a suitable connection 21 so that said scalebeam will rock about its fulcrum provided on the upstanding portion 19 in response to movements of the housing 13, a counter-poise 22 being provided for adjustment of the scalebeam in a well known manner.

Referring to Fig. 6 it will be noted that the scalebeam comprises a pair of parallel members that are connected together by a cross member 23 at one end thereof and between which a pivot pin 24 extends. A suitable suspending member such as the hook 25, extends from the scalebeam to an L-shaped lever 26, which lever is provided with a plurality of openings therein whereby the movements of said lever 26 responsive to the movements of the scalebeam 20 can be adjusted. Said lever has a forwardly extending arm 27, which is connected with the controlling device 28 so as to serve as the actuating means therefor.

The shaft 29, which is suitably mounted on the base of the hopper, has a pulley 30 mounted thereon to rotate therewith, which is driven from a suitable driving means, such as a motor, having a pulley over which the belt that operates over the pulley 30 extends. A shaft 31 is driven from the shaft 29 through suitable driving means and the shaft 32 is connected with the shaft 31 by means of a universal joint 33, said shaft 32 serving as driving means for the conveying means 14, said driving means including a sprocket 34 on the opposite end of the shaft 32 to that having the universal joint 33. The shaft 31 also has a sprocket mounted thereon over which the sprocket chain 35 operates, which also operates over the sprocket 36 on my improved controlling device 28. As the shaft 29 and the shaft 32 rotate at a constant speed, the sprocket 36 rotates at a constant speed. Furthermore it will be noted that the speed of the sprocket 36 is directly proportional to the rate of rotation of the conveying member 14 in the housing 13.

The controlling device 28 is provided with a housing that has a body portion 37 that has a removable end wall 38 and which has a cover plate 39. The shaft 40 has the sprocket 36 fixed thereto to rotate therewith and is provided with suitable bearings 41 and 42 in the removable wall 38 and in the main body portion of the housing 37. The shaft 40 accordingly is rotated at a constant speed that is directly proportional to the speed of the conveying means 14. The shaft 40 rotates at a speed that is much slower than that of the shaft 31, inasmuch as the sprocket on the shaft 31 is much smaller than the sprocket 36.

The shaft 40 has a gear 43 mounted thereon to rotate therewith. Said gear 43 meshes with gears 44 and 45 mounted on a pair of rotatable members that have body portions 46, upon which the gears are mounted in such a manner as to rotate with said body portions. One of the gears 44 is shown in Fig. 5 and is mounted in fixed position on the body portion 46 of the rotatable member, which in turn is mounted on a sleeve 47 that is mounted on a shaft 48, which shaft is mounted in suitable bearings 49 and 50 in the wall 38 and the body portion 37 of the housing, respectively. The gear 45 is mounted in a similar manner on a rotatable member that is similarly mounted on the shaft 51 to the rotatable member 46.

The sleeves 47 are slidable axially on the shafts 48 and 51 and it will accordingly be obvious that the body portions 46 of the rotatable members and the gears 44 and 45 thereon are rotatable on the shafts 48 and 51 and also longitudinally slidable on said shafts with said sleeves 47. A gear 52 is mounted co-axially with the gear 44 and is fixed on the shaft 48. A gear 53 co-axially mounted to the gear 45 meshes with the gear 52 and is freely rotatably mounted on the shaft 51.

The shaft 54 is mounted in suitable bearings 55 in the end wall 38 and a cover plate 56 is provided for preventing endwise movement of the shaft and its bearings in the housing. The forwardly extending arm 27 of the L-shaped lever 26 is secured to the shaft 54 by means of a set screw 57 so that the shaft 54 will rock in its bearings upon movement up and down of the lever 26 with the scalebeam 27, such up and down movement causing the lever to swing about the axis of the shaft 54 at the end of the forwardly extending arm 27 thereof connected with said shaft 54. Mounted on the shaft 54 is a block 58, said block being mounted on an enlargement 59 provided on the shaft 54 and being clamped in position thereon so as to move therewith by means of the bolt 60, which screw-threadedly engages said block 58 and serves as a set screw for holding said block in position on said shaft to rock therewith. The bolt 60 is provided with a knurled head 61 for rotating the same. A compression spring 62 is mounted between the upper face of the block 58 and a sheet metal lever 63, which has a flange 64 thereon with which the head 61 of the bolt engages and between which and the block 58 the spring 62 is located.

The sheet metal lever 63 serves as a rocker and is in some respects similar to a walking beam, having the arms 65 and 66 thereon that extend in opposite directions from the shaft 54 and taper toward their extremities. Flexible members, such as chains 67 and 68, are secured to the end portions 69 and 70 of the arms 65 and 66 and wedges 71 and 72 are suspended from said chains 67 and 68 and thus suspended from said extremities of said arms 65 and 66.

Levers 73 and 74 are pivotally mounted at their upper ends on pivot members 75 that are mounted in the body portion 37 of the housing. Springs 76 are mounted between the levers 73 and 74 and the end wall 38, urging said levers toward the right or counter-clockwise about their pivots 75 as viewed in Fig. 3. Each of said levers at its lower end has an enlargement 77 that has a cylindrical bore in which a cylindrical tubular member 78 is slidably mounted. Said member 78 has an end wall 79 between which and the end wall 80 of the cylindrical bore in the enlargement 77 a compression coil spring 81 is mounted. Said coil spring is very strong and tends to move the member 78 outwardly or away from the wall 80. The movement in such outward direction is limited by a pin 82 on the member 77 engaging in the slot 83 in the member 78. The end wall 79 is inclined as will be evident from Fig. 3.

The enlargement 77 has a forward projection 84 thereon, which has a transverse opening therein through which a bolt-like member 85 extends. Said bolt-like member has a head 86 thereon (see Fig. 7) and is secured in position by means of a nut 87. A roller 88 is mounted on said bolt-like member for rotation on the enlargement 89 provided thereon adjacent the head 86, said head 86 being preferably recessed into the roller, as shown in Fig. 7. Each of said levers is provided with a roller 88, which engages a cam on a rotatable member, as well be described below.

The cam 90 is provided on the rotatable member that has the gear 44 provided thereon and the cam 91 is provided on the rotatable member that has the gear 45 provided thereon. Each of said cams has a pair of uniformly inclined cam surfaces 92 extending to the high point 93 on each thereof. Said cams are duplicates and the roller, upon engagement with the cam surface 92 rising toward the high point 93, will cause the arm on which said roller is mounted to be moved toward the left as viewed in Fig. 3 until the high point 93 of the cam is reached, whereupon the descending face 92 of the cam will cause the arm having the roller 88 that is in engagement therewith to move again to the right under the action of the spring 76. Due to the strength of the spring 81 the members 77 and 78 will ordinarily move as a unit under the action of the roller 88 engaging the cam and thus these members along with the roller 88 constitute a follower for the cam with which the roller 88 engages. The roller on the lever 73 engages with the cam 90 and the roller on the lever 74 engages with the cam 91.

Each of the gears 52 and 53 is provided with a lining of frictional gripping material 94, which is mounted in a recess 95 in the gear. The frictional gripping lining 94 thus serves as means for establishing a driving connection between the gears 44 and 52 and the gears 45 and 53, respectively, upon engagement of the gears 44 and 45 with such lining, said slidable gears and frictional gripping lining thus constituting clutching means to establish a driving connection between the rotatable member having the gear 44 thereon and the gear 52 and the rotatable member having the gear 45 thereon and the gear 53.

When the shaft 54 is in the position shown in the drawings, which is that in which the scalebeam 20 is in balanced position, the lever or rocker member 63 will be horizontally disposed with the arm 65 thereof horizontally opposite the arm 66 thereof, and the wedges 71 and 72 will be in a middle raised position in which these have no effect on the operation of the clutching device above referred to. Upon rocking of the lever or rocker member 63 out of horizontal position one of the arms thereof will ascend and the other descend, and thus one of the wedges will move above its normal or middle raised position to a higher position and the other will descend below this middle raised position or to a depressed position. Upon reference to Fig. 3 it will be noted that if the wedging member 71 is moved downwardly, the inclined face of said wedging member will be adjacent the inclined end wall 79 of the member 78 and will thus be in such position that movement of the lower end of the lever 73 toward the left in Fig. 3 will cause the wall 79 to engage the wedging member 71. The amount of movement that will be required before such engagement takes place is dependent upon the amount that the wedging member 71 has descended out of its normal or middle raised position, and that will be dependent upon the amount of rocking of the lever 63 in such a direction that the arm 65 thereof will swing downwardly, which movement will be determined by the movement of the arm 27 of the L-shaped lever 26 connected with the scalebeam 20 and will thus be proportional to the amount of movement of the scalebeam out of its balanced position.

Upon engagement of the end wall 79 of the member 78 with the wedge 71, the wedge 71 becomes a solid abutment in view of the fact that its rear face is in engagement with the wall 38, said wedges sliding up and down closely adjacent said wall. This will limit the movement of the roller 88 under the influence of the cam 90, and since the roller and its mounting will not yield, due to the strength of the spring 81, under normal conditions, the roller will move the cam endwise of the shaft 48 instead of said roller moving away from the gear 44 under the influence of the cam and the rotatable member carrying the gear 44 will be moved toward the gear 52 and into engagement with the frictional gripping lining 94 thereof for an interval dependent upon what portion of the cam 90 approaching its high point 93 will be engaged by the roller 88 after the end wall 79 has engaged the wedge 71.

Engagement of the gear 44 with the lining 94 will cause the gear 52 to rotate with the gear 44 for the interval that such engagement exists, rotating the shaft 48 and the sprocket 96 in the same direction as the gear 44 through a corresponding portion of a rotation in said direction. Thus rotation of the sprocket 96 will be for an interval dependent upon the amount that the lever 63 has been moved out of horizontal position by means of the lever 26 mounted on the scalebeam 20.

Rotation of the sprocket 96 will cause the variable speed transmission 9 to be adjusted, as a sprocket chain 97 is provided which operates over the sprocket 96, and a sprocket 98 that adjusts the variable speed transmission 9 in the desired direction to change the rate of feed of the feeding means in the feeding member 11. Upon such change in the rate of feed of the member 11 the weight of the material in the weighing housing 13 will be changed so as to change the position of the scalebeam 20 and the position of the rocker or lever 63. If the adjustment of the variable speed transmission 9 is insufficient during the first interval of engagement of the gears 44 and 52 due to the cooperation of the cam 90, roller 88, wedge 71 and end wall 79 of the member 78, the rocker 63 will adjust its position so as to raise the end thereof that carries the wedge 71 only partially to its horizontal or middle position, and move the wedge 71 only partially to its middle normal position, and thus make a greater movement of the roller 88 away from the gear 52 necessary before engagement of the wall 79 with the wedge 71, thus reducing the interval of driving engagement of the gears 44 and 52 and causing a smaller increment of movement of the sprocket 96 to take place, again adjusting the variable speed transmission 9. Such adjustment will continue until a balance of the scalebeam results.

Should, however, any one of such adjusting movements of the sprocket member 96 be too great so that the scalebeam is thrown out of balance in the opposite direction, then the wedging member 72 will descend below its middle normal position, due to the fact that the arm 66 of the lever or rocker 63 is lowered, and upon such movement of the wedging member 72 downwardly out of its normal middle position the cam 91 in co-operation with the roller 88 will cause driving engagement between the rotatable member carrying the gear 45 and the gear 53, and since the gear 53 meshes with the gear 52 such driving engagement of the gear 45 with the gear 53 will rotate the gear 52 and the shaft 48 in the opposite direction to that obtained by driving engagement of the gear 44 with the gear 52, rotating the sprocket member 96 in the opposite direction for an interval dependent upon the amount that the wedging member 72 has descended, thus adjusting the variable speed transmission in the opposite direction to change the rate of feed of the feeding device 11 to bring the scalebeam 20 toward a balanced position. The springs 81 and 62 only yield in case of any jamming of the parts of the apparatus to prevent breakage of parts. Ordinarily the members 78 and lever 63 move with the members 77 and the block 58, respectively, as though rigidly connected therewith, the springs being provided to prevent damage to the apparatus should jamming of any of the movable parts occur.

While my improved controlling device is shown as being utilized for adjusting a variable speed transmission to adjust the rate of feed of a feeding device supplying material to a weighing means, obviously my improved controlling device can be utilized for adjusting any member that is to be adjusted to control the output of any desired apparatus. Thus, instead of using the controlling means for controlling the feed of material by changing the rate of feed of a movable feeding member, rotation of the sprocket 96 in opposite directions under the influence of the controlling device can be utilized for adjusting any suitable means for controlling the rate of feed, such as a gate, which can be raised and lowered by suitable rotatable means controlled by said sprocket, or any other adjusting member that is adjusted in opposite directions by rotation of an operating member in opposite directions can be controlled by my improved controlling device through suitable connections with the sprocket 96 or any other driving means provided on the shaft 48 at the output end of my controlling device.

What I claim is:

1. The combination with an adjusting member movable in opposite directions and an actuating member movable in opposite directions from a predetermined position, of means for determining the position of said adjusting member in response to the position of said actuating member comprising a pair of members mounted for rotation about parallel axes, means for rotating said members at the same rate, a shaft, a driving connection between said shaft and adjusting member, a rock shaft connected with said actuating member to turn from a predetermined normal position thereof through an arc and in a direction corresponding to the displacement of said actuating member out of its normal position, and means for selectively establishing an intermittent driving connection between a rotatable member and said shaft by movement of said rock shaft out of said normal position for intervals determined by the position of said rock shaft out of normal.

2. The combination with an adjusting member movable in opposite directions and an actuating member movable in opposite directions from a predetermined position, of means for determining the position of said adjusting member in response to the position of said actuating member comprising a pair of members mounted for rotation about parallel axes, means for continuously rotating said members, a gear associated with each of said rotatable members, a shaft, a driving connection between said shaft and adjusting member, one of said gears being fixed to said shaft and the other gear meshing therewith, a rock shaft connected with said actuating member to turn from a predetermined normal position thereof through an arc and in a direction corresponding to the displacement of said actuating member out of its normal position, and means for selectively establishing a driving connection between a rotatable member and the gear associated therewith by movement of said rock shaft out of said normal position for an interval determined by the position of said rock shaft out of normal, comprising a rocker mounted on said rock shaft for movement with said rock shaft and means mounted on said rocker for determining said driving connection in accordance with the direction of rotation of said rock shaft out of said predetermined position.

3. The combination with an adjusting member movable in opposite directions and an actuating member movable in opposite directions from a predetermined position, of means for determining the position of said adjusting member in response to the position of said actuating member comprising a shaft, a driving connection between said shaft and adjusting member, a rock shaft connected with said actuating member to turn from a predetermined position thereof through an arc and in a direction corresponding to the displacement of said actuating member out of its predetermined position, and means for rotating said shaft for an interval and in a direction determined by the amount and direction said rock shaft is displaced out of said predetermined position, comprising a pair of controlling members and means mounting said controlling members on said rock shaft for movement therewith.

4. The combination with an adjusting member movable in opposite directions and an actuating member movable in opposite directions from a predetermined position, of means for determining the position of said adjusting member in response to the position of said actuating member comprising an input shaft rotating at a constant rate, an output shaft, a driving connection between said output shaft and said adjusting member, a rock shaft connected with said actuating member to turn from a predetermined position thereof through an arc and in a direction corresponding to the displacement of said actuating member out of its predetermined position, and means for selectively establishing a driving connection between said input shaft and said output shaft to rotate said output shaft in a direction and through an arc determined by the direction and amount said rock shaft is displaced out of said predetermined position, comprising clutch means, a pair of clutch controlling members and means mounting said clutch controlling members on said rock shaft.

5. Means for determining the position of an adjusting member in response to the position of an actuating member comprising a pair of members mounted for rotation about parallel axes, means for continuously rotating said members, a shaft, a driving connection between said shaft and adjusting member, a rock shaft connected with said actuating member to turn from a predetermined normal position thereof through an arc and in a direction corresponding to the displacement of said actuating member out of normal position, and means for selectively establishing a driving connection between a rotatable member and said shaft by movement of said rock shaft out of said predetermined position for an interval determined by the position of said rock shaft out of normal, comprising clutch means, a cam and means cooperating with said cam to engage said clutch means comprising a member connected with said rock shaft and having a position determined by the position of said rock shaft.

6. Means for determining the position of an adjusting member in response to the position of an actuating member comprising a pair of members mounted for rotation about parallel axes, means for continuously rotating said members, a gear associated with each of said rotatable members, a shaft, a driving connection between said shaft and adjusting member, one of said gears being fixed to said shaft and the other gear meshing therewith, a rock shaft connected with said actuating member to turn from a predetermined normal position thereof through an arc and in a direction corresponding to the displacement of said actuating member out of normal position, and means for selectively establishing a driving connection between a rotatable member and the gear associated therewith for part of a rotation of said rotatable member by movement of said rock shaft out of said predetermined position for an interval determined by the amount said rock shaft is turned from said predetermined position, comprising a pair of controlling members mounted on said rock shaft for movement with said rock shaft and means cooperating with said controlling members to determine said driving connection in accordance with the direction and amount of turning of said rock shaft out of said predetermined position.

7. Means for determining the position of an adjusting member in response to the position of an actuating member comprising a shaft, a driving connection between said shaft and adjusting member, a rock shaft connected with said actuating member to turn from a predetermined position thereof through an arc and in a direction corresponding to the displacement of said actuating member out of normal position, and means for rotating said shaft for an interval and in a direction determined by the amount and direction said rock shaft is turned from said predetermined position, comprising a lever connected with said rock shaft and controlling members suspended from said lever.

8. Means for determining the position of an adjusting member in response to the position of an actuating member comprising an input shaft rotating at a constant rate, an output shaft, a driving connection between said output shaft and said adjusting member, a rock shaft connected with said actuating member to turn from a predetermined normal position thereof through an arc and in a direction corresponding to the displacement of said actuating member out of normal position, and means for selectively establishing a driving connection between said input shaft and said output shaft to rotate said output shaft in a direction and through an arc determined by the direction and amount said rock shaft is turned from said predetermined position, comprising a pair of clutches, a cam controlling each of said clutches and means mounted for movement with said rock shaft cooperating with each of said cam to determine the effect of said cam on the clutch controlled thereby.

9. Means for determining the position of an adjusting member responsive to an output responsive member comprising a rock shaft connected with said output responsive member to turn through an arc and in a direction determined by the displacement of said output responsive member, a shaft, a driving connection between said shaft and said adjusting member, constant speed driving means, and means for establishing a driving connection between said driving means and said shaft for an interval and in a direction determined by the direction and amount said rock shaft is out of normal position, comprising a pair of driving connection controlling members mounted on said rock shaft for movement therewith.

10. A controlling apparatus comprising a rock shaft having a normal position, means for turning said shaft about its axis out of normal position in either direction, an adjusting shaft and means for rotating said adjusting shaft through an arc and in a direction determined by the amount and direction of turning of said rock shaft out of normal position comprising a rotating shaft, and transmission means between said rotating shaft and said adjusting shaft for rotating said adjusting shaft in opposite directions including clutch means, wedging means controlled by movement of said rock shaft, cams and followers cooperating with said wedging means to selectively engage said clutch means to rotate said adjusting shaft in the selected one of said directions for an interval determined by the amount and direction said rock shaft is turned out of normal position.

11. Means for determining the position of an adjusting member in response to the position of an actuating member movable in opposite directions, comprising a lever mounted for swinging movement about a central transverse axis and connected with said actuating member for movement responsive to movements thereof, said lever having a predetermined position corresponding to the predetermined position of said actuating member, an input shaft, an adjusting shaft, and means for selectively establishing a driving connection between said input shaft and adjusting shaft upon swinging of said lever out of said predetermined position, including means suspended from said lever controlling turning of said adjusting shaft in one direction upon depression of one end of said lever for turning of said adjusting shaft in the other direction upon depression of the other end of said lever.

12. The combination with an adjusting member movable in opposite directions and an actuating member movable in opposite directions from a predetermined position, of means for determining the position of said adjusting member in response to the position of said actuating member comprising a lever mounted for swinging movement about a central transverse axis and connected with said actuating member for movement responsive to movements thereof, said lever having a predetermined position corresponding to the predetermined position of said actuating member, an input shaft, an output shaft, a driving connection between said output shaft and said adjusting member, and means for selectively establishing a driving connection between said input shaft and output shaft upon swinging of said lever out of said predetermined position, including means for turning said output shaft in one direction upon depression of one end of said lever and means for turning said output shaft in the other direction upon depression of the other end of said lever, said means including members suspended from the ends of said lever to move up and down therewith and clutch means controlled thereby to turn said shaft through an arc determined by the amount the depressed end of said lever is depressed.

13. The combination with an adjusting member movable in opposite directions and an actuating member movable in opposite directions from a predetermined position, of means for determining the position of said adjusting member in response to the position of said actuating member comprising a lever mounted for swinging movement about a central transverse axis and connected with said actuating member for movement responsive to movements thereof, said lever having a predetermined position corresponding to the predetermined position of said actuating member, an input shaft, an output shaft, a driving connection between said output shaft and said adjusting member, and means for selectively establishing a driving connection between said input shaft and output shaft upon swinging of said lever out of said predetermined position, including means for turning said output shaft in one direction upon depression of one end of said lever and means for turning said output shaft in the other direction upon depression of the other end of said lever, said means including a wedge suspended from each end of said lever to move up and down therewith and clutch means controlled thereby to turn said shaft through an arc determined by the amount the depressed end of said lever is depressed.

14. The combination with an adjusting member movable in opposite directions and an actuating member movable in opposite directions from a predetermined position, of means for determining the position of said adjusting member in response to the position of said actuating member comprising a pair of members mounted for rotation about parallel axes, means for rotating said members at the same rate, a shaft, a driving connection between said shaft and an adjusting member, a lever mounted for swinging movement about a central transverse axis and connected with said actuating member for movement responsive to movements thereof, said lever having a predetermined position corresponding to the predetermined position of said actuating member, and means for selectively establishing a driving connection between a rotatable member and said shaft comprising clutch means and clutch controlling members suspended from the ends of said lever to move up and down therewith and each cooperating with said clutch means to turn said shaft through an arc determined by the amount the end of said lever from which said controlling member is suspended is depressed.

15. In a controlling device, a member mounted to swing about a central transverse axis, a pair of members mounted for rotation about parallel axes, means for rotating said members at the same rate in the same direction, a gear coaxially mounted with each of said rotatable members, a shaft, one of said gears being fixed to said shaft and the other gear meshing therewith, and means for selectively establishing a driving connection between a rotatable member and the gear coaxial therewith, comprising clutch means between each of said rotatable members and each of said gears, a cam on each of said rotatable members, and means cooperating with each cam to engage the clutch means associated therewith comprising wedge members suspended from the ends of said swingably mounted member.

16. In a controlling device, a member mounted to swing about a central transverse axis, a pair of members mounted for rotation about parallel axes, means for rotating said members at the same rate, a shaft, and means for selectively establishing a driving connection between a rotatable member and said shaft, comprising clutch means between each of said rotatable members and said shaft, each of said rotatable members being mounted for axial movement to engage said clutch means, a cam on each of said rotatable members, a follower for each cam, means yieldingly engaging said followers with said cams and wedge members suspended from the ends of said swingably mounted member engaging said followers to limit the yielding movement of a follower upon depression of the end of said member suspending said wedge member.

17. In a controlling device, a member mounted to swing about a central transverse axis, a pair of members mounted for rotation about parallel axes, means for rotating said members at the same rate, a shaft, and means for selectively establishing a driving connection between a rotatable member and said shaft, comprising clutch means between each of said rotatable members and said shaft, each of said rotatable members being mounted for axial movement to engage said clutch means, a cam on each of said rotatable members, a follower for each cam comprising a pivoted arm, a roller mounted on said arm remote from its pivotal mounting, a spring urging said arm to yieldingly engage said roller with said cam and wedge members suspended from the ends of said swingably mounted member, each of said wedge members being movable into a position to limit the yielding of one of said rollers upon depression of the end of said swingably mounted member suspending said wedge member.

18. In a controlling device, a member mounted to swing about a central transverse axis, a pair of members mounted for rotation about parallel axes, means for rotating said members at the same rate in the same direction, a gear coaxially mounted with each of said rotatable members, a shaft, one of said gears being fixed to said shaft and the other gear meshing therewith, and means for selectively establishing a driving connection between a rotatable member and the gear coaxial therewith, comprising clutch means between each of said rotatable members and each of said gears, each of said rotatable members being mounted for axial movement to engage said clutch means, a cam on each of said rotatable members, a follower for each cam comprising a pivoted arm, a roller mounting on the end of said arm remote from the pivotal mounting thereof, a roller mounted on one end thereof, a spring urging said arm to yieldingly engage said roller with said cam, a fixed abutment spaced from the other end of said mounting, and wedge members suspended from the ends of said swingably mounted member, each of said wedge members being movable into a position between said abutment and mounting to limit the yielding of one of said rollers upon depression of the end of said swingably mounted member suspending said wedge member.

19. In a controlling device, a member mounted to swing about a central transverse axis, a pair of members mounted for rotation about parallel axes, means for rotating said members at the same rate, a shaft, and means for selectively establishing a driving connection between a rotatable member and said shaft, comprising clutch means between each of said rotatable members and said shaft, a cam on each of said rotatable members, and members suspended from the ends of said swingably mounted member cooperating with said cams to engage the clutch means associated therewith.

20. In a controlling device, a member mounted to swing about a central transverse axis, a pair of members mounted for rotation about parallel axes, means for rotating said members at the same rate, a shaft, and means for selectively establishing a driving connection between a rotatable member and said shaft, comprising clutch means between each of said rotatable members and said shaft, a cam on each of said rotatable members, and members suspended from the ends of said swingably mounted member cooperating with said cams to engage the clutch means associated therewith for a part of a revolution of the rotatable member carrying said cam.

21. In a controlling device, a member mounted to swing about a central transverse axis, a pair of members mounted for rotation about parallel axes, means for rotating said members at the same rate, a shaft, and means for selectively establishing a driving connection between a rotatable member and said shaft, comprising clutch means between each of said rotatable members and said shaft, a cam on each of said rotatable members, and members suspended from the ends of said swingably mounted member cooperating with said cams to engage the clutch means associated therewith for a part of a revolution of the rotatable member carrying said cam, the position of said suspended members determining the selection of the driving connection and the interval of clutch engagement during said revolution.

22. In a controlling device, a member mounted to swing about a central transverse axis, a pair of members mounted for rotation about parallel axes, means for rotating said members at the same rate, a shaft, and means for selectively establishing a driving connection between a rotatable member and said shaft, comprising clutch means between each of said rotatable members and said shaft, a cam on each of said rotatable members, a follower for each cam, means yieldingly engaging said followers with said cams and members suspended from the ends of said swingably mounted member engaging said followers to limit the yielding movement of a follower upon depression of the end of said member suspending said last mentioned member.

23. In a controlling device, a member mounted to swing about a central transverse axis, a pair of members mounted for rotation about parallel axes, means for rotating said members at the same rate, a shaft, and means for selectively establishing a driving connection between a rotatable member and said shaft, comprising a clutch means between each of said rotatable members and said shaft, each of said rotatable members being mounted for axial movement to engage said clutch means, a cam on each of said rotatable members, a follower for each cam comprising a pivoted arm, a roller mounted on said arm remote from its pivotal mounting, a spring urging said arm to yieldingly engage said roller with said cam and means suspended from said swingably mounted member movable into a position to limit yielding of one of said swingably mounted members out of normal position.

24. The combination with weighing means comprising material conveying means, of adjusting means and means for controlling the adjustment of said adjusting means responsive to said weighing means, comprising a pair of rotatable members, means for rotating said members at a speed directly proportional to the speed of said conveying means, and means for establishing a driving connection between a selected rotatable member and said adjusting means for an interval determined by said weighing means.

References Cited in the file of this patent

UNITED STATES PATENTS

| | | |
|---|---|---|
| 2,047,203 | Henson | July 14, 1936 |
| 2,569,585 | Small | Oct. 2, 1951 |
| 2,590,029 | Minorsky | Mar. 18, 1952 |
| 2,622,532 | Hamill | Dec. 23, 1952 |
| 2,637,434 | Harper | May 5, 1953 |
| 2,687,044 | Smith | Aug. 24, 1954 |